(12) United States Patent
Sen et al.

(10) Patent No.: US 10,192,146 B2
(45) Date of Patent: Jan. 29, 2019

(54) MACHINE LEARNING TO PROCESS MONTE CARLO RENDERED IMAGES

(71) Applicant: The Regents of the University of California, Oakland, CA (US)

(72) Inventors: Pradeep Sen, Goleta, CA (US); Steve Bako, Santa Barbara, CA (US); Nima Khademi Kalantari, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/840,754

(22) Filed: Dec. 13, 2017

(65) Prior Publication Data
US 2018/0114096 A1    Apr. 26, 2018

Related U.S. Application Data

(63) Continuation of application No. 15/144,613, filed on May 2, 2016.

(60) Provisional application No. 62/155,104, filed on Apr. 30, 2015.

(51) Int. Cl.
| | |
|---|---|
| *G06K 9/62* | (2006.01) |
| *G06T 5/00* | (2006.01) |
| *G06N 3/08* | (2006.01) |
| *G06N 7/00* | (2006.01) |

(52) U.S. Cl.
CPC .......... *G06K 9/6256* (2013.01); *G06N 3/084* (2013.01); *G06N 7/005* (2013.01); *G06T 5/002* (2013.01); *G06T 2207/20081* (2013.01); *G06T 2207/20084* (2013.01)

(58) Field of Classification Search
CPC ........ B32B 17/10027; B32B 17/10036; B32B 17/10082; B32B 17/10605; B32B 17/10614; B32B 17/10688; B32B 17/10761; B32B 17/10935; B32B 2264/102; B32B 2307/102; B32B 2307/412; B32B 2307/546
See application file for complete search history.

(56) References Cited

PUBLICATIONS

Cook et al., "Distributed Ray Tracing", Computer Graphics (Proceeding of SIGGRAPH 84), vol. 18, No. 3, pp. 137-144, 1984.
Lee et al., "A note on the use of nonlinear filtering in computer graphics", IEEE Computer Graphics and Applications 10, vol. 3, pp. 23-29, May 1990.
Rushmeier et al., "Energy preserving non-linear filters", ACMSIGGRAPH 1994, pp. 131-138, New York, NY, USA, 1994.
Jensen et al., "Optimizing path tracing using noise reduction filters", Winter School of Computer Graphics (WSCG 1995), pp. 134-142, 1995.
Bala et al., "Combining edges and points for interactive high-quality rendering", ACM Trans. Graph. 22, pp. 631-640, Jul. 2003.
Xu et al., "A novel Monte Carlo noise reduction operator", IEEE Computer Graphics and Applications 25, pp. 31-35, 2005.

(Continued)

*Primary Examiner* — Manuchehr Rahmjoo
(74) *Attorney, Agent, or Firm* — Greer, Burns & Crain, Ltd.; Steven P. Fallon (57) ABSTRACT

A method of rendering an image includes Monte Carlo rendering a scene to produce a noisy image. The noisy image is processed to render an output image. The processing applies a machine learning model that utilizes colors and/or features from the rendering system for denoising the noisy image and/or to for adaptively placing samples during rendering.

10 Claims, 7 Drawing Sheets

(56) References Cited

PUBLICATIONS

Egan et al., "Practical filtering for efficient ray-traced directional occlusion", ACM Trans. Graph. 30, 180:1-180:10, Dec. 6, 2011.

Egan et al., "Frequency analysis and sheared reconstruction for rendering motion blur", ACM Trans. Graph. 28, vol. 875, No. 3, pp. 1-13, 2009.

Egan et al., "Frequency analysis and sheared filtering for shadow light fields of complex occluders", ACM Trans. Graph. 30, vol. 882, No. 2, 9:1-9:13, Apr. 2011.

Mehta et al., "Axis aligned filtering for interactive sampled soft shadows", ACM Trans. Graph. 31, 163:1-163:10, Nov. 6, 2012.

Mehta et al., "Axis-aligned filtering for interactive physically-based diffuse indirect lighting", ACM Trans. Graph. 32, 4(July), 96:1-933 96:12, 2013.

Mehta et ah, "Factored axis-aligned filtering for rendering multiple distribution effects", ACM Trans. Graph. 33, 4 (July), 57:1-57:12 (2014).

McCool, M.D., "Anisotropic diffusion for Monte Carlo noise reduction", ACM Trans. Graph. 18, 2 (1999), 171-194.

Segovia et al., "Non-interleaved Deferred Shading of Interleaved Sample Patterns", Graphics Hardware, 2006.

Laine et al., "Incremental instant radiosity for real-time indirect illumination", Proceedings of the 18th Eurographics Conference on Rendering Techniques, Eurographics Association, Aire-la-Ville, Switzerland, EGSR'07, 277-908 286 (2007).

Dammertz et al., "Edge-avoiding A-trous wavelet transform for fast global illumination filtering", Proceedings of High Performance Graphics 2010, pp. 67-75, 2010.

Bauszat et al., "Guided image filtering for interactive high-quality global illumination", Computer Graphics Forum (Proc. of Eurographics Symposium on Rendering (EGSR) 30, 4 (Jun. 2011), pp. 1361-1368.

Shirley et al., "A local image reconstruction algorithm for stochastic rendering", Symposium on Interactive 3D Graphics and Games, ACM, New York, NY, 984 USA, 13D '11, 9-14, 2011.

Chen et al., Efficient depth-of-field rendering with adaptive sampling and multiscale reconstruction, Computer Graphics Forum 30, 6 (2011), 1667-1680.

Hachisuka et al., "Multidimensional Adaptive Sampling and Reconstruction for Ray Tracing", ACM Transactions on Graphics, vol. 27, No. 3, Article 33, Aug. 2008.

Sen et al., "On Filtering the Noise from the Random Parameters in Monte Carlo Rendering", ACM Transactions on Graphics, vol. 31, No. 3, Mar. 2011.

Li et al., "SURE-based Optimization for Adaptive Sampling and Reconstruction", ACM Transactions on Graphics, vol. 31, No. 6, Article 194, Nov. 2012.

Rousselle et al., "Robust denoising using feature and color information", Computer Graphics Forum 32, 7, 121-130 (2013).

Moon et al., "Adaptive Rendering Based on Weighted Local Regression", ACM Transactions on Graphics (TOG), vol. 33 Issue 5, Aug. 2014.

Grzeszczuk et al., "NeuroAnimator: Fast Neural Network Emulation and Control of Physics-Based Models", Proceedings of the 25th Annual Conference on Computer Graphics and Interactive Techniques, 887 ACM, New York, NY, USA, SIGGRAPH '98, 9-20 (1998).

Nowrouzezahrai et al., "Shadowing dynamic scenes with arbitrary BRDFs", Computer Graphics Forum 28, 2, 249-258 (2009).

C. Dachsbacher, "Analyzing Visibility Configurations", IEEE Trans. Vis. and Comp. Graphics 17, 4, 475-476, 2011.

Ren et al., "Global Illumination with Radiance Regression Functions", ACM Transactions on Graphics, vol. 32, No. 4, Article 130, Jul. 2013.

Jakob et al., "Progressive Expectation-Maximization for Hierarchical Volumetric Photon Mapping", Eurographics Symposium and Rendering, vol. 20, No. 4, 2011.

MACHINE LEARNING TO PROCESS MONTE CARLO RENDERED IMAGES

PRIORITY CLAIM AND REFERENCE TO RELATED APPLICATION

This application claims priority under 35 U.S.C. § 120 and is a continuation of prior U.S. application Ser. No. 15/144,613, filed May 2, 2016, which application claims priority under 35 U.S.C. § 119 from prior U.S. provisional application Ser. No. 62/155,104, which was filed Apr. 30, 2015. All applications mentioned in this paragraph are incorporated by reference herein.

STATEMENT OF GOVERNMENT INTEREST

This invention was made with government support under grant number Nos. IIS-1321168 and IIS-1342931 awarded by the National Science Foundation. The government has certain rights in the invention.

FIELD

Fields of the invention include computer graphics rendering and image processing, particularly rendering and processing of Monte Carlo-rendered images, including both photorealistic images and cartoon or other graphic renderings. Practical applications include, for example, rendering of photorealistic and non-photorealistic computer-generated imagery for films, TV shows, video games, rendering of cartoon graphics, and rendering of graphics and images generated via physically-based path tracers.

BACKGROUND

Producing photorealistic images or cartoon images from a 3D scene model requires computing the light transport through a scene, which requires estimation of a complex multidimensional integral of the light scene function at every pixel of the image. For example, generating effects like depth of field and motion blur requires integrating over domains such as lens/viewpoint position and time. Monte Carlo (MC) rendering systems approximate this integral by tracing light rays (samples) in the multidimensional space to evaluate the scene function. Although an approximation to this integral can be quickly evaluated with just a few samples, the error of this estimate relative to the true value appears as unacceptable noise in the resulting image. Since the variance of the MC estimator decreases linearly with the number of samples, many samples are required to get a reliable estimate of the integral. The high cost of computing additional rays results in lengthy render times that negatively affect the applicability of MC renderers in modern film production.

One way to mitigate this problem is to quickly render a noisy image with a few samples and then filter it as a post-process to generate an acceptable, denoised result. This approach has been the subject of extensive research in recent years. Successful methods typically use feature-based filters (e.g., cross-bilateral or cross non-local means filters) to leverage additional scene features, such as world position, that help guide the filtering process. Since these features are highly correlated with scene detail, using them in the filtering process greatly improves the quality of the results.

Some approaches have used this information to handle specific distributed effects such as global illumination and depth of field. However, a major challenge is how to exploit this additional information to denoise distributed effects, which requires setting the filter parameters for all features so that noise is removed while scene detail is preserved. To do this, some have proposed to use the functional dependencies between scene features and random parameters calculated using mutual information, a process that removes noise but was slow. Several other algorithms build upon this by using error estimation metrics to select the best filter parameters from a discrete set. The main drawback of these methods is that their error metrics are usually noisy at low sampling rates, reducing the accuracy of filter selection. Furthermore, they choose the filter parameters from a preselected, discrete set that may not contain the optimum. As a result, these methods produce images with over/under blurred regions.

Since the introduction of distributed ray tracing by Cook et al., (Cook et al., "Distributed Ray Tracing" Computer Graphics (Proceeding of SIGGRAPH 84) 18, 3 (1984), 137-144) researchers have proposed a variety of algorithms to address the noise in Monte Carlo (MC) rendering. Some of these include variance reduction techniques, low-discrepancy sampling patterns, new Monte Carlo formulations with faster convergence, and methods that exploit specific properties of the multidimensional integrand position or reuse samples based on the shape of the multidimensional integrand.

Filtering approaches render a noisy image with a few samples and then denoise images through a filtering process. Some methods adaptively sample as well, further improving the results. Some previous work on MC filtering use only sample color during filtering and others use additional scene information.

Color-based filter methods are inspired by traditional image denoising techniques and use only pixel color information from the rendering system to remove MC noise. Early work by Lee and Redner used nonlinear filters (median and alpha-trimmed mean filters) to remove spikes while preserving edges. See, Lee & Redner, "A note on the use of nonlinear filtering in computer graphics," IEEE Computer Graphics and Applications 10, 3 (May 1990), 23-29. Rushmeier and Ward proposed to spread the energy of input samples through variable width filter kernels. See, Rushmeier and Ward, "Energy preserving non-linear filters," ACMSIGGRAPH '94 (New York, N.Y., USA, 1994), pp. 131-138. To reduce the noise in path-traced images, Jensen and Christensen separated illumination into direct and indirect components, filtered the indirect portion, and then added the components back together. See, Jensen and Christensen, "Optimizing path tracing using noise reduction filters," Winter School of Computer Graphics (WSCG) 1995 (1995), pp. 134-142. Bala et al. exploited an edge image to facilitate the filtering process. See, Bala et al., "Combining edges and points for interactive high-quality rendering," ACM Trans. Graph. 22 (July 2003), 631-640. Xu and Pattanaik used a bilateral filter to remove MC noise. See, Xu and Pattanaik, "A novel Monte Carlo noise reduction operator," IEEE Computer Graphics and Applications 25 (2005), 31-35. Egan et al. used frequency analysis to shear a filter for specific distributed effects such as motion blur and occlusion/shadowing. See, Egan et al., "Practical filtering for efficient ray-traced directional occlusion," ACM Trans. Graph. 30, 6 (December 2011), 180:1-180:10; Egan et al., "Frequency analysis and sheared reconstruction for rendering motion blur," ACM Trans. Graph. 28, 875 3, 1-13 (2009); Egan et al., "Frequency analysis and sheared filtering for shadow light fields of complex occluders," ACM Trans. Graph. 30, 2 (April), 882 9:1-9:13 (2011). Mehta et al. used related analysis to derive simple formulas that set the variance of a screen-space Gaussian filter to target noise from specific effects. See, Mehta et al., "Axis aligned filtering for interactive sampled soft shadows," ACM Trans. Graph. 31, 6 (November), 163:1-163:10 (2012); Mehta et al., "Axis-aligned filtering for interactive physically-based diffuse indirect lighting," ACM Trans. Graph. 32, 4 (July), 96:1-933 96:12 (2013); Mehta et al., "Factored axis-aligned filtering for rendering multiple distribution effects," ACMTrans. Graph. 33, 4 (July), 57:1-57:12 (2014). Some of these approaches use the analysis to adaptively position samples as well as conducting filtering and denoising operations.

Other filters use information in addition to or other than color. The additional information can include scene features (e.g., world positions, shading normals, texture values, etc.) which are computed by the MC renderer. Thus, they tend to generate higher-quality results compared to the color-based approaches described above. For example, McCool removed MC noise by using depths and normals to create a coherence map for an anisotropic diffusion filter. See, McCool, M. D., "Anisotropic diffusion for Monte Carlo noise reduction," ACM Trans. Graph. 18, 2 (1999), 171-194. To efficiently render scenes with global illumination, Segovia et al. and Laine et al. used a geometry buffer. See, e.g., Segovia et al., "Non-interleaved Deferred Shading of Interleaved Sample Patterns," Proceedings of the 21st ACM SIGGRAPH/EUROGRAPHICS Symposium on Graphics Hardware ACM, New York, N.Y., USA, GH '06, 53-60 (2006); Laine et al., "Incremental instant radiosity for real-time indirect illumination," Proceedings of the 18th Eurographics Conference on Rendering Techniques, Eurographics Association, Aire-la-Ville, Switzerland, Switzerland, EGSR '07, 277-908 286 (2007). Meanwhile, to reduce global illumination noise, Dammertz et al. incorporated wavelet information into the bilateral filter. See, Dammertz et al., "Edge-avoiding A-trous wavelet transform for fast global illumination filtering," Proceedings of High Performance Graphics 2010 (2010), pp. 67-75. Bauszat et al. used guided image filtering. See, Bauszat et al., "Guided image filtering for interactive high-quality global illumination," Computer Graphics Forum (Proc. of Eurographics Symposium on Rendering (EGSR)) 30, 4 (June 2011), 1361-1368. Shirley et al. used a depth buffer to handle depth of field and motion blur effects. See, Shirley et al., "A local image reconstruction algorithm for stochastic rendering," Symposium on Interactive 3D Graphics and Games, ACM, New York, N.Y., 984 USA, I3D '11, 9-14 (2011). Chen et al. combined a depth map with sample variance to filter the noise from depth of field. See, Chen et al., "Efficient depth-of-field rendering with adaptive sampling and multiscale reconstruction," Computer Graphics Forum 30, 6 (2011), 1667-1680. These methods are directed to a fixed set of distributed effects and are not applicable to general Monte Carlo rendering noise.

Hachisuka et al. performed adaptive sampling and reconstruction based on discontinuities in the multidimensional space. See, Hachisuka et al., "Multidimensional Adaptive Sampling and Reconstruction for Ray Tracing," ACM Transactions on Graphics, Vol. 27, No. 3, Article 33, August 2008. Although this method handles general distributed effects, it suffers from the curse of dimensionality when a scene contains multiple effects.

To handle general MC noise using additional scene features, Sen and Darabi observed the need to vary a filter's feature weights across the image. See, Sen & Darabi, "On Filtering the Noise from the Random Parameters in Monte Carlo Rendering," ACM Transactions on Graphics, Vol. 31, No. 3, March 2011. Specifically, they proposed to compute these weights using mutual information to approximate the functional dependencies between scene features and the random parameters. Li et al. used Stein's unbiased risk estimator (SURE) to estimate the appropriate spatial filter parameters in a cross-bilateral filter, while hard coding the weights of the remaining cross terms. See, Li et al, "SURE-based Optimization for Adaptive Sampling and Reconstruction," ACM Transactions on Graphics, Vol. 31, No. 6, Article 194, November 2012. Rousselle et al. significantly improved upon this by using the SURE metric to select between three candidate cross non-local means filters that each weight color and features differently. See, Rousselle et al., "Robust denoising using feature and color information," Computer Graphics Forum 32, 7, 121-130 (2013). Moon et al. compute a weighted local regression on a reduced feature space and evaluate the error for a discrete set of filter weights to select the best one. See, Moon et. al., "Adaptive Rendering Based on Weighted Local Regression," ACM Transactions on Graphics (TOG) Volume 33 Issue 5, August 2014.

A significant drawback to the above approaches, which constitute the state of the art, is that they weight each filter term through either heuristic rules and/or an error metric which is quite noisy at low sampling rates. Thus, they are not able to robustly estimate the appropriate filter weights in challenging cases.

Neural networks have been used in computer graphics processing. Grzeszczuk used neural networks to create physically realistic animation. See, Grzeszczuk et al., "NeuroAnimator: Fast Neural Network Emulation and Control of Physics-Based Models," Proceedings of the 25th Annual Conference on Computer Graphics and Interactive Techniques, 887 ACM, New York, N.Y., USA, SIGGRAPH '98, 9-20 (1998). Nowrouzezahrai et al. used neural networks to predict per vertex visibility. See, Nowrouzezahrai et al. "Shadowing dynamic scenes with arbitrary BRDFs," Computer Graphics Forum 28, 2, 249-258 (2009). Dachsbacher classified different visibility configurations using neural networks. See, Dachsbacher, C., "Analyzing Visibility Configurations," IEEE Trans. Vis. And Comp. Graphics 17, 4, 475-476, 2011. Ren et al. used a neural network to model the radiance regression function to render indirect illumination of a fixed scene in real time. See, Ren et al., "Global Illumination with Radiance Regression Functions," ACM Transactions on Graphics, Vol. 32, No. 4, Article 130, July 2013. Neural networks have also been directly trained on a set of noisy and clean patches and used to denoise natural images. However, methods applied to natural images are not applicable for rendered images, since they assume a single noise level for the entire image.

Jakob et al. have a method that, while not utilizing neural networks, performs learning through expectation maximization to find the appropriate parameters of a Gaussian mixture model to denoise photon maps. See, Jakob et al., "Progressive Expectation-Maximization for Hierarchical Volumetric Photon Mapping," Eurographics Symposium and Rendering, Vol. 20, No. 4, 2011. Photon mapping has been applied to density estimation. Photon mapping is unrelated to Monte Carlo denoising, especially since no filtering is applied in the photon mapping. The Gaussian mixture models in this approach do not translate to Monte Carlo denoising.

SUMMARY OF THE INVENTION

A method of rendering an image includes Monte Carlo rendering a scene to produce a noisy image. The noisy image is processed to render an output image. The processing applies a machine learning model that utilizes colors and/or features from the rendering system for denoising the noisy image and/or for adaptively placing samples during rendering. In one approach, the machine learning model had been trained with ground truth sample images prior to its application. In one approach the machine learning model is applied directly to the noisy image. In another approach, the machine learning model determines parameters of an explicit denoiser.

DETAILED DESCRIPTION OF THE PREFERRED EMBODIMENTS

Monte Carlo rendering allows for the generation of realistic and artistic images by computer. However, the resulting images may contain objectionable noise artifacts produced by the Monte Carlo process which estimates the images in the first place. As such, the images are considered noisy, unless enough computation has been performed to ensure that they are not. The term "noise" when used alone herein refers to Monte Carlo or MC noise that reduces image quality, and not desirable noise, such as that which may be applied to a surface as a texture to achieve a certain desired artistic effect. The term "image" as used herein includes photorealistic images, as well as cartoon or other graphic renderings produced by a physically-based rendering system.

Preferred embodiments of the invention leverage machine learning to process a noisy image of a scene and produce a denoised output image. In one type of processing, a machine learning model that has been trained with ground truth images denoises the noisy image to produce an output image with noise removed. Artisans will appreciate that this is a fundamentally different problem than the problem of removing noise in a standard natural image captured with a camera, and for which many successful denoising algorithms have proposed. There are specific issues that arise in MC rendering that are not true in natural image denoising, which makes it not obvious how to port algorithms for regular image denoising to MC denoising. As a first example, in standard natural image denoising the noise level is usually constant across the image (because it is an artifact of the imaging system), whereas in MC rendering the amount of noise can vary widely across a single image because the variance of the MC estimator can change from region to region. Furthermore, the noise in Monte Carlo rendering systems is usually much more severe than the one of standard natural images. Therefore, state-of-the-art image denoising algorithms cannot be used for Monte Carlo rendering, even those that use machine learning.

In one type of processing, a machine learning model that has been trained with ground truth images denoises the noisy image to produce an output image with noise removed. A "ground truth" image can be defined as one which has been rendered with many samples (often thousands) so that it has basically converged to the theoretical ideal, and represents a final goal to be achieved when rendering. The training set should contain a wide range of different scenes so that the learning system will learn to handle a wide variety of noise types. The training set does not have to contain scenes that are similar in style or appearance to the final test scenes. However, it should contain such a wide variety of scenes and distributed effects so that the system will be able to handle new test scenes properly. In a second type of processing, the trained machine learning algorithm is used to adaptively place samples to reduce noise in the output image or to improve the filtering process. Both types of processing can also be combined in a system which uses machine learning for both adaptive sampling as well as for denoising the remaining noise at the end.

Preferred embodiments of the present invention provide a machine learning approach to remove noise in Monte Carlo (MC) rendered images. In one embodiment, the machine learning algorithm can perform the filtering directly, using any kind of machine learning technique for the learning algorithm (neural networks, deep neural networks, multilayer perceptrons (MLP), convolutional networks (CNNs), deep CNNs, recurrent neural networks, autoencoder neural networks, long short-term memory (LSTM) networks, generative adversarial networks (GANs), support vector machines, or random forests, to give a few examples). In the direct filtering approach, the machine learning algorithm takes information from the rendering system and directly provides the denoised pixel as output. The information from the rendering system can include sample colors and/or other features (such as depth, world position, surface normal, texture values), as well as functions of these (such as the variance of features). A block of features surrounding a given pixel, for example, can also be used as input. To train this machine learning algorithm, a set of noisy training images, along with their associated ground truth, noise-free results, is presented to the algorithm during the training process. This kind of machine learning is called "supervised learning" because each input has a ground truth "solution" that is provided to the learning system during training. However, it might also be able to train a filtering system without supervised training, such as by using a generative adversarial network (GAN) to produce artifact-free images that cannot be distinguished by a trained discriminator function from a ground-truth, noise-free image. Once trained, the machine learning algorithm is provided with new noisy images coming from a Monte Carlo rendering system and produces the final filtered result. This direct approach becomes more effective with larger sets of training images.

Other embodiments are more effective with comparatively smaller sets of training images. In these embodiments, the machine learning algorithm is combined with a human-designed filter such as a cross-bilateral or non-local means filter to produce the final filtered results. Other types of filters include image denoising methods such as block-matching and 3D filtering (BM3D) and Bayes least squares-Gaussian scale mixtures (BLS-GSM). In the most general sense, a filter can simply be a set of weights arranged in a rectangular (or square) neighborhood around a pixel, which are then multiplied by the respective colors at the corresponding pixels and added together to form the final pixel value. In the filter-based approaches, the machine learning algorithm would be trained to output filter parameters (such as filter bandwidths) that produce a filtered result comparable to the ground truth. For example, in a cross-bilateral filter, the machine learning algorithm could output the variances of the different cross-terms to adjust their influence in the final result. In the case where the filter is simply a set of weights used to weigh the color values and then add them together, the learning algorithm would output these weight parameters. Once trained, new noisy images from a Monte Carlo system are fed into the machine learning system, which then outputs the filter parameters, which can be different for each pixel of the image. The noisy images are filtered with the parameters calculated (using the associated feature information such as depth, surface normals, and texture values) to produce the final filtered result.

In another embodiment that determines optimal filter parameters, the complex relationship between the ideal filter parameters and a set of features extracted from the input noisy samples is modeled with a multilayer perceptron (MLP) neural network, which is a nonlinear regression model. The MLP network is combined with a filter such that the MLP can take in a set of secondary features extracted from a local neighborhood at each pixel and output a set of filter parameters. Secondary features include, for example, color variance or texture value average that are not directly computed during the rendering process, but can be computed from the features that come from the renderer. These parameters and the noisy samples are given as inputs to the filter to generate a filtered pixel that is compared to the ground truth pixel during training. If the filter is differentiable, the error between the ground truth pixel and the filtered value can be backpropagated through the filter to update the parameters of the neural network. If the filter is not differentiable, numerical differentiation can serve as an approximation for training. During training, the MLP is trained on a set of scenes with a variety of distributed effects so that a variety of scenes can be properly denoised.

Results tend to improve with the size of the training sets and higher numbers of varieties of distributed effects. This is generally true with either the direct filter approach or the filter parameter approach. Depending upon the particular machine learning model and training set, however, at some size and complexity of training set, the direct filter approach will produce better results than using the machine learning model to obtain filter parameters. Likewise, below some size and complexity of training set, the filter parameter approach will tend to produce better results than using the neural network for direct filtering.

Other machine learning models can be used in either of the direct or filter parameter approaches. One example is support vector machines, and other examples include the previously-mentioned neural networks, deep neural networks, multi-layer perceptrons (MLP), convolutional networks (CNNs), deep CNNs, recurrent neural networks, autoencoder neural networks, long short-term memory (LSTM) networks, and generative adversarial networks (GANs). While the machine learning algorithm can use one or more secondary features as input, an individual feature or basic color values can also be used as input.

In some embodiments, multiple machine learning algorithms are trained and used to perform different filter functions. For example, one machine learning algorithm can filter the direct illumination and the other to filter the indirect illumination, since they each have different noise properties.

During rendering, these two kinds of illumination can be separated from each other. Then two machine learning models can be used: one to filter direct illumination and another to filter indirect illumination. The filtered direct and indirect illumination can then be combined to obtain the final illumination in the filtered image. In another example, diffuse illumination can be filtered separately from specular illumination. Furthermore, illumination can be separated from texture during rendering, and filtered separately. Then at the end, the texture can be combined back in to produce the final result.

Instead of or in addition to denoising, an option is to train a machine learning network to conduct Monte Carlo adaptive sampling, which positions the rendered samples better to produce an improved result. A preliminary image is first sampled with a small number of samples using a non-adaptive sampling scheme (e.g., uniform sampling). The information from these initial samples (e.g., sample colors and other feature information such as depth, surface normals, and texture values) is fed into a machine learning system that generate a sampling map for the next sampling pass. This sampling map specifies how many samples each pixel gets in the subsequent pass, and this process of sampling and then computing the sampling map can repeat for a predetermined number of times, e.g., 1 or 2 times, until a quality threshold is met or until a sampling budget is exhausted.

In preferred embodiments, part of the algorithm that generates the new sampling map includes a machine learning step. For example, prior art has used metrics such as Stein Unbiased Risk Estimator (SURE) to determine the amount of error in the samples already computed, and then allocates more samples in the sampling map to pixels with greater error. In one embodiment of the invention, the SURE metric is replaced by a machine learning algorithm that has been trained to estimate error more accurately than SURE. In another embodiment, a machine learning algorithm would directly generate the sampling map itself.

In some embodiments, the machine learning algorithm is trained to produce the optimal sampling map based on a filter in the back-end that will denoise the result. For example, if the algorithm knows that a region will be filtered correctly to produce a noise-free result, there is no need to allocate more samples to that region even though it may still be noisy. In other cases, the machine learning algorithm is trained to produce the optimal sampling map assuming no filtering is occurring at the back-end, except perhaps for a standard, box-filter reconstruction at each pixel.

The training of the machine learning models for these embodiments can be done on a set of images with a variety of distributed effects and then applied to different images containing various distributed effects or characteristics such as, for example, motion blur, depth of field, area lighting, glossy reflections, and global illumination. As discussed earlier, the machine learning approach can include, for example, training a neural network with a filter to produce denoised or noise-free images, or training a model to directly output denoised or noise-free images.

There is a complex relationship between the input noisy image and the ground truth image, that both the direct denoising or denoising via optimal filter parameters approaches need to capture. In both embodiments, the denoised pixel can be produced using different factors (e.g., feature variances and noise in local regions), but each individual factor by itself might not be able to accurately predict them. Based on these observations, example embodiments include a supervised learning method which learns the complex relationship between these factors and the denoised output. According to one version of the method, a nonlinear regression model is trained on a set of noisy MC rendered images and their corresponding ground truth images, using a multilayer perceptron (MLP) coupled with a matching filter during training and refinement. Similarly, in another embodiment, the neural network is trained on a set of noisy MC images and their corresponding ground truth images.

As an example, for training a model using supervised learning, the method renders both noisy images at low sampling rates as well as their corresponding ground truth images for a set of scenes with a variety of distributed effects. The method can then process the noisy images and extracts a set of useful features in square regions around every pixel. The method is trained based on the extracted features or the original rendered data to drive the filter to produce images or directly produce images that resemble the ground truth. This can be done according to a specific error metric, such as the typical L2 loss used in machine learning, but others as well such as L1, SSIM, and relative MSE, which is applied in paragraphs 64-66 below.

After the neural network has been trained, the method can now denoise new noisy renderings with general distributed effects. The method is fast (and may take a few seconds or less) and produces better results than existing methods for a wide range of distributed effects including depth of field, motion blur, area lighting, glossy reflections, and global illumination. Further, unlike earlier approaches, in one embodiment, no adaptive sampling is performed. In another embodiment of the method, adaptive sampling may be included. Once the machine learning algorithm is trained, a preferred embodiment method of the invention provides post-processing that effectively removes MC noise. The method includes: reducing general MC noise using machine learning including supervised learning for MC noise reduction; and training a neural network to generate results that are close to ground truth images. In other implementations, the machine learning may be support vector machines, random forests, and other kinds of machine learning, including the previously-mentioned neural networks, deep neural networks, multi-layer perceptrons (MLP), convolutional networks (CNNs), deep CNNs, recurrent neural networks, autoencoder neural networks, long short-term memory (LSTM) networks, and generative adversarial networks (GANs). As such, the methods are not limited to neural networks.

Those knowledgeable in the art will appreciate that embodiments of the present invention lend themselves well to practice in the form of computer program products. Accordingly, it will be appreciated that embodiments of the present invention may comprise computer program products comprising computer executable instructions stored on a non-transitory computer readable medium that, when executed, cause a computer to undertake methods according to the present invention, or a computer configured to carry out such methods. The executable instructions may comprise computer program language instructions that have been compiled into a machine-readable format. The non-transitory computer-readable medium may comprise, by way of example, a magnetic, optical, signal-based, and/or circuitry medium useful for storing data. The instructions may be downloaded entirely or in part from a networked computer. Also, it will be appreciated that the term "computer" as used herein is intended to broadly refer to any machine capable of reading and executing recorded instructions. It will also be understood that results of methods of the present invention may be displayed on one or more monitors or displays (e.g., as images, text, graphics, charts, code, etc.), shown as part of an interactive application (e.g., images and graphics for a video game), printed on suitable media, printed on film and projected, stored in appropriate memory or storage, digital media (e.g., DVD, BluRay, etc.), etc.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figure 1:
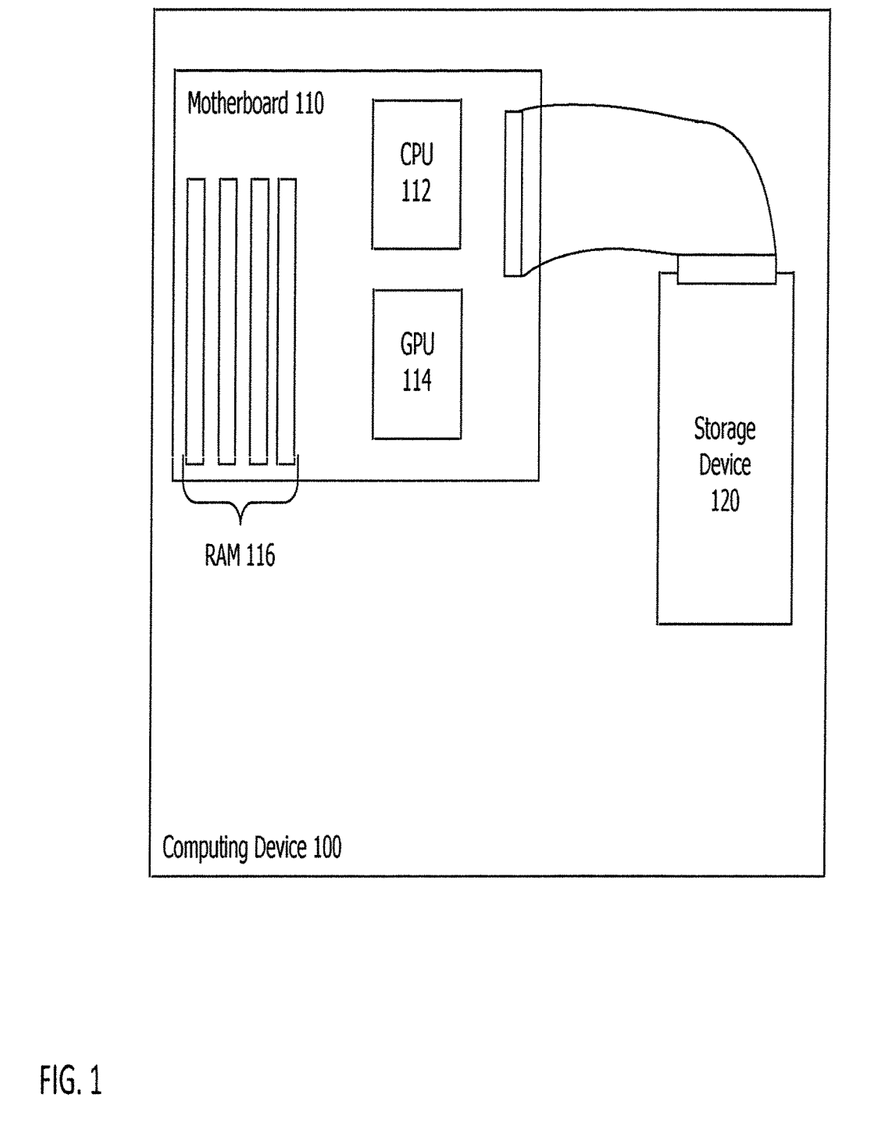
FIG. 1 is a block diagram of the internal components of a computing device on which the methods described herein may execute.
Figure 2:
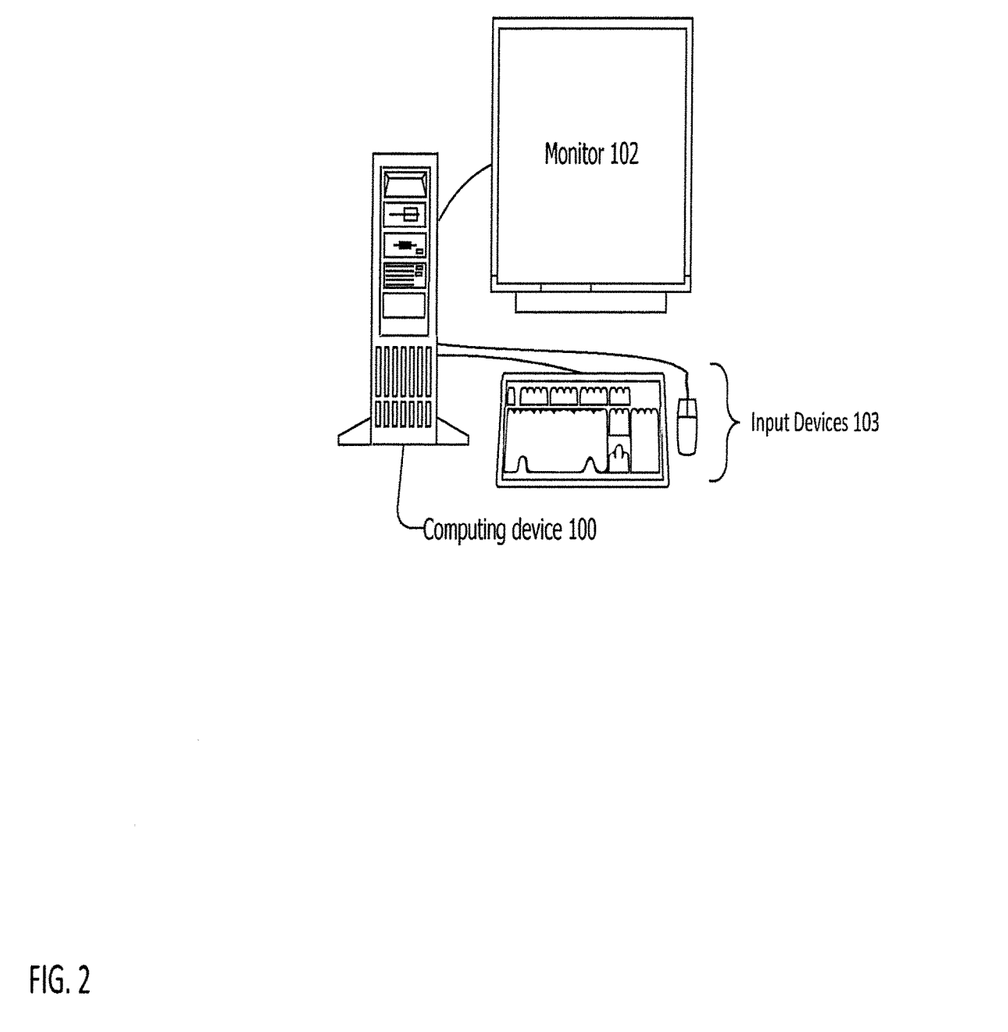
FIG. 2 is a block diagram of a computing device on which the methods described herein may execute.

The methods described herein may be implemented on a computing device such as a computer workstation or personal computer. An example computing device 100 is shown in FIGS. 1 and 2. The computing device has at least one central processing unit (CPU 112), which typically has multiple cores, a specialized graphics processing unit (GPU 114), sufficient memory (random access memory, RAM 116), and a non-volatile storage device 120. Storage device 120 is typically a solid state (also known as silicon storage) device (SSD) or hard disk drive (HDD) or combination thereof. The GPU may be included on a motherboard 110 with the CPU or be included on an add-on card. Other components included in computing device 100 that are commonly included are not shown, including, for example, one or more network interface cards or chips (NICs) that allow for network communication, buses such as universal serial bus (USB), peripheral component interconnect express (PCIe bus), serial advanced technology attachment (SATA), serial attached small computer system interface) (serial attached SCSI or SAS), and others. Images may be displayed on one or more monitors 102 coupled with the computing device 100. User input may be provided via one or more input devices 103 such as a keyboard, mouse, track ball, track pad or digitized pen as well as a touch screen included with monitor 102. The computing device 100 runs an operating system such as, for example, a version of Linux, Apple OS X, Microsoft Windows, and Ubuntu.

In an example experimental demonstration, a preferred filter parameter method was implemented and run on a computing device having an INTEL quad-core 3.7 GHz CPU with 24 GB of RAM and a GeForce GTX TITAN GPU from NVIDIA Corporation. Many other computing device configurations may be used; this is merely provided as an example.

Figure 3:
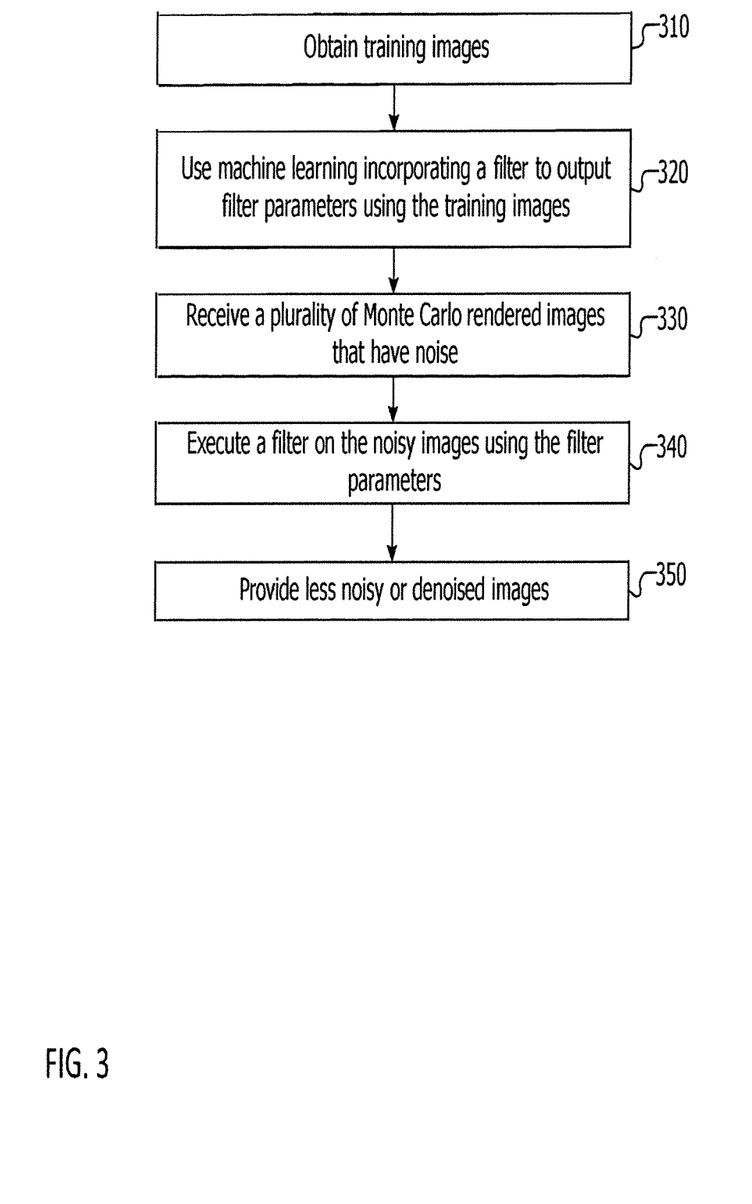
FIG. 3 is a flow chart of a method of filtering Monte Carlo noise from images.

The goal of the method described herein is to take a noisy input image rendered with only a few samples and generate a noise-free image that is similar to the ground truth image rendered with many samples. Referring now to FIG. 3, there is shown a flow chart of an overview of a method described herein. The FIG. 3 method includes obtaining training images as shown in block 310. Noisy and ground truth training images are obtained and used. The machine learning algorithm is trained using the training images to output filter parameters, as shown in block 320. This training can be for direct denoising or can be for computing the filter parameters, as discussed above. The machine learning model may be a neural network, a support vector machine, a random forest, and other kinds of machine learning, and other examples include the previously-mentioned neural networks, deep neural networks, multi-layer perceptrons (MLP), convolutional networks (CNNs), deep CNNs, recurrent neural networks, autoencoder neural networks, long short-term memory (LSTM) networks, and generative adversarial networks (GANs). Once trained, a plurality of Monte Carlo rendered images having noise (aka noisy images) are obtained, as shown in block 330. The machine learning algorithm directly denoises the rendered images or provides optimal parameters to a filter that is then executed on or applied to the noisy images using the estimated filter parameters, as shown in block 340. Denoised or ideally noise-free images are produced, as shown in block 350.

Figure 6:
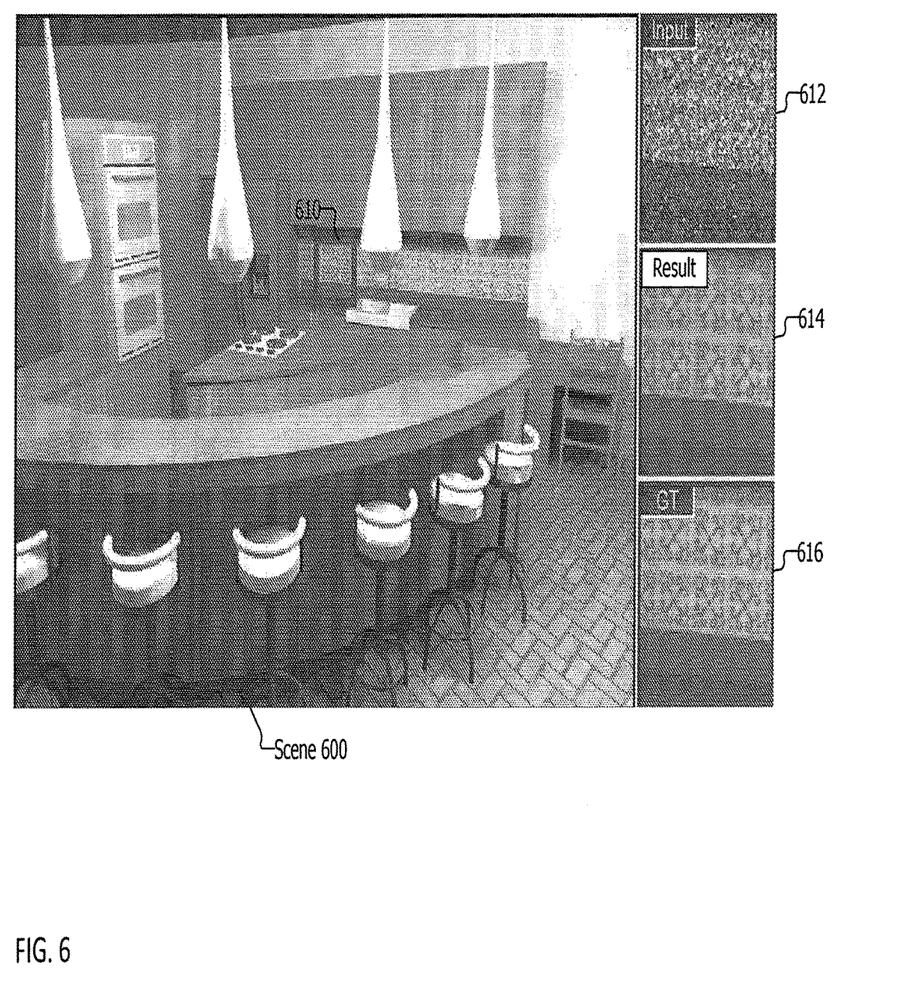
FIG. 6 is a first scene and a portion thereof showing the results of method of filtering Monte Carlo noise from images.
Figure 7:
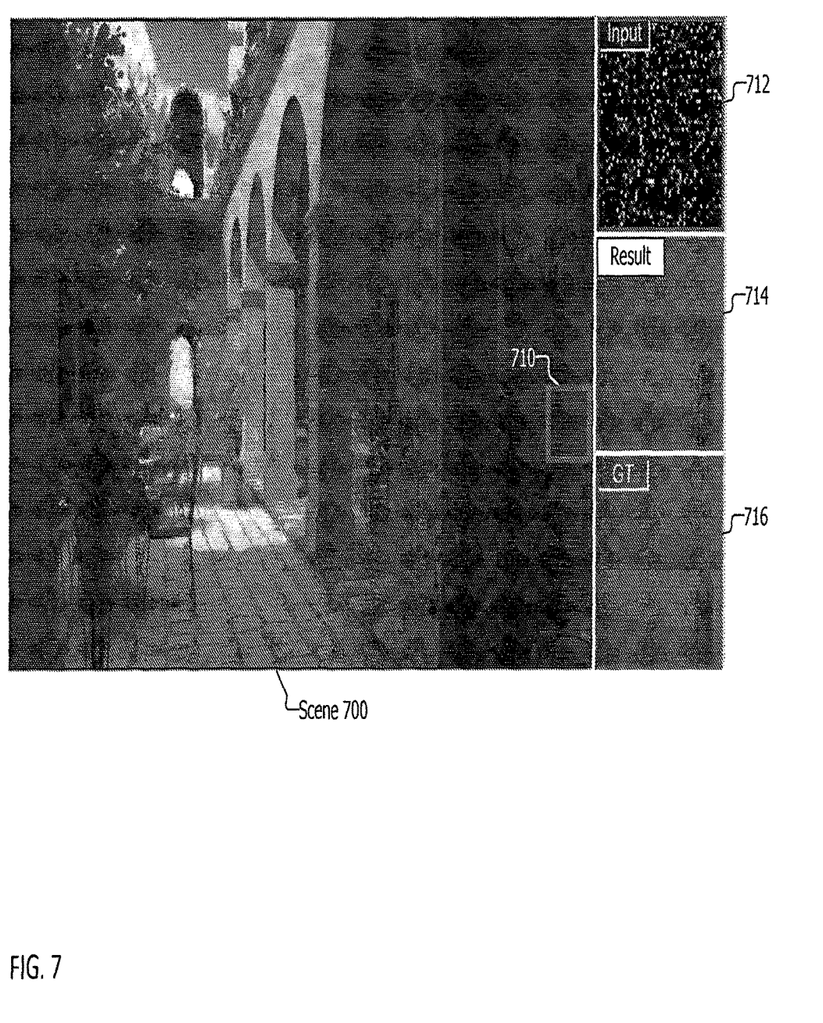
FIG. 7 is a second scene and a portion thereof showing the results of method of filtering Monte Carlo noise from images.

Examples of the results of the application of the method are shown in FIGS. 6 and 7. Scenes 600 and 700 are provided. Sample image portions 610 and 710 are selected. MC rendering is performed resulting in image portions 612 and 712. The image portions 612 and 712 are received as input to the method. The ground truth versions of the image portions are shown as 616 and 716. Image portions 614 and 714 show result image portions produced from application of the method of filtering Monte Carlo noise from images described herein. As is shown, the results are striking.

Returning now to discussion of the example method that determines filter parameters of a hard-coded filter, the filtered image is defined as $$\hat{c} = \{\hat{c}_r, \hat{c}_g, \hat{c}_b\}$$

at pixel i is computed as a weighted average of all of the pixels in a square $$\hat{c}_i = \frac{\sum_{j \in \mathcal{N}(i)} d_{i,j} \bar{c}_j}{\sum_{j \in \mathcal{N}(i)} d_{i,j}},$$

neighborhood N(i) (for example, 55×55 pixels in size) centered around pixel i:

where $d_{i,j}$ is the weight between pixel i and its neighbor j as defined by the filter and $\bar{c}_j$ is the noisy pixel color computed by averaging all the sample colors in pixel j. For example, for a standard Gaussian filter, $d_{i,j}$ would be the Gaussian-weighted distance between pixels i and j in the spatial domain. More sophisticated filters, such as the cross-bilateral filter, may be used because they can leverage additional scene features (e.g., world positions, shading normals, texture values, etc.) to improve the quality of filtering. When using a cross-bilateral filter, $d_{i,j}$ is:

$$d_{i,j} = \exp\left[-\frac{\|\bar{p}_i - \bar{p}_j\|^2}{2\alpha_i^2}\right] \times \exp\left[-\frac{D(\bar{c}_i, \bar{c}_j)}{2\beta_i^2}\right] \times \prod_{k=1}^{K} \exp\left[-\frac{D_k(\bar{f}_{i,k}, \bar{f}_{j,k})}{2\gamma_{k,i}^2}\right],$$

where $\bar{p}_j$ and $\bar{f}_{i,k}$ refer to pixel i's screen space position and scene feature k, respectively, and $\alpha_2^2$, $\beta_i^2$ and $\gamma_{k,i}^2$ are the variances at pixel i for the spatial, color, and $k_{th}$ feature terms. Here, D and $D_k$ are specific distance functions for colors and scene features. In a preferred method, the cross-bilateral filter is used, in other versions other differentiable filters may be used or even non-differentiable filters where the gradients are approximated numerically. Furthermore, in other implementations, the learning system can output weights $d_{i,j}$, or even output the final color $\bar{c}$ directly.

The filtering process may be written as:

$$\hat{c}_i = h(\bar{s}_{N(i)}, \theta_i), \text{ where } \bar{s}_{N(i)} = \bigcup_{j \in N(i)} \bar{s}_j.$$

Here, $\bar{s}_{N(i)}$ is the collection of mean primary features in the neighborhood of the $i_{th}$ pixel. The term "primary features" refers to scene features that are computed directly by the rendering system when shading samples. Primary features include sample positions, colors, and K scene features such as world positions, depths, shading normals, direct illumination visibility and texture values (namely first and second intersection texture colors). The term "mean" refers to averaging the features of every sample in a pixel. In the filtering process, h is the filter function which implements the filtering described above. $\Theta_i$ is an array of M filter parameters at pixel i. To identify the filter parameters $\hat{\Theta}_i$ that approximate the optimum parameters $\Theta_i^*$, the noisy mean primary features in a pixel's neighborhood are processed to generate a set of more meaningful data called "secondary features" $x_i = \{x_1, x_2, \ldots x_N\}_i$. The secondary features include feature variances, noise approximation in local regions, and the like. The filter parameters are approximated through an energy function of the secondary features: $\hat{\Theta}_i = \mathcal{G}(x_i)$. The relationship between the secondary features and the optimal filter parameters is complicated and difficult to model. For this reason the method uses the following energy minimization function on training images:

$$\mathcal{G}^* = \arg\min_{\mathcal{G}} E(h(\bar{s}_{N(i)}, \mathcal{G}(x_i)), c_i).$$

This energy function is used to compute the filter parameters that will generate a filtered image close to ground truth.

To avoid problems in computing the optimal filter parameters heuristically, preferred methods employ a learning system that directly minimizes errors in the final rendered image. A nonlinear regression model based on a neural network is utilized and directly combined with a matching filter during training and later application. Ground truth images are used during training to directly compute the error between the filtered and ground truth image without need for error estimation. During a processing stage, the trained machine learning model (resulting from iterations that minimize the error computed by the energy function) is applied to additional or secondary features from new scenes to compute filter parameters that produce results close to the ground truth.

Figure 4:
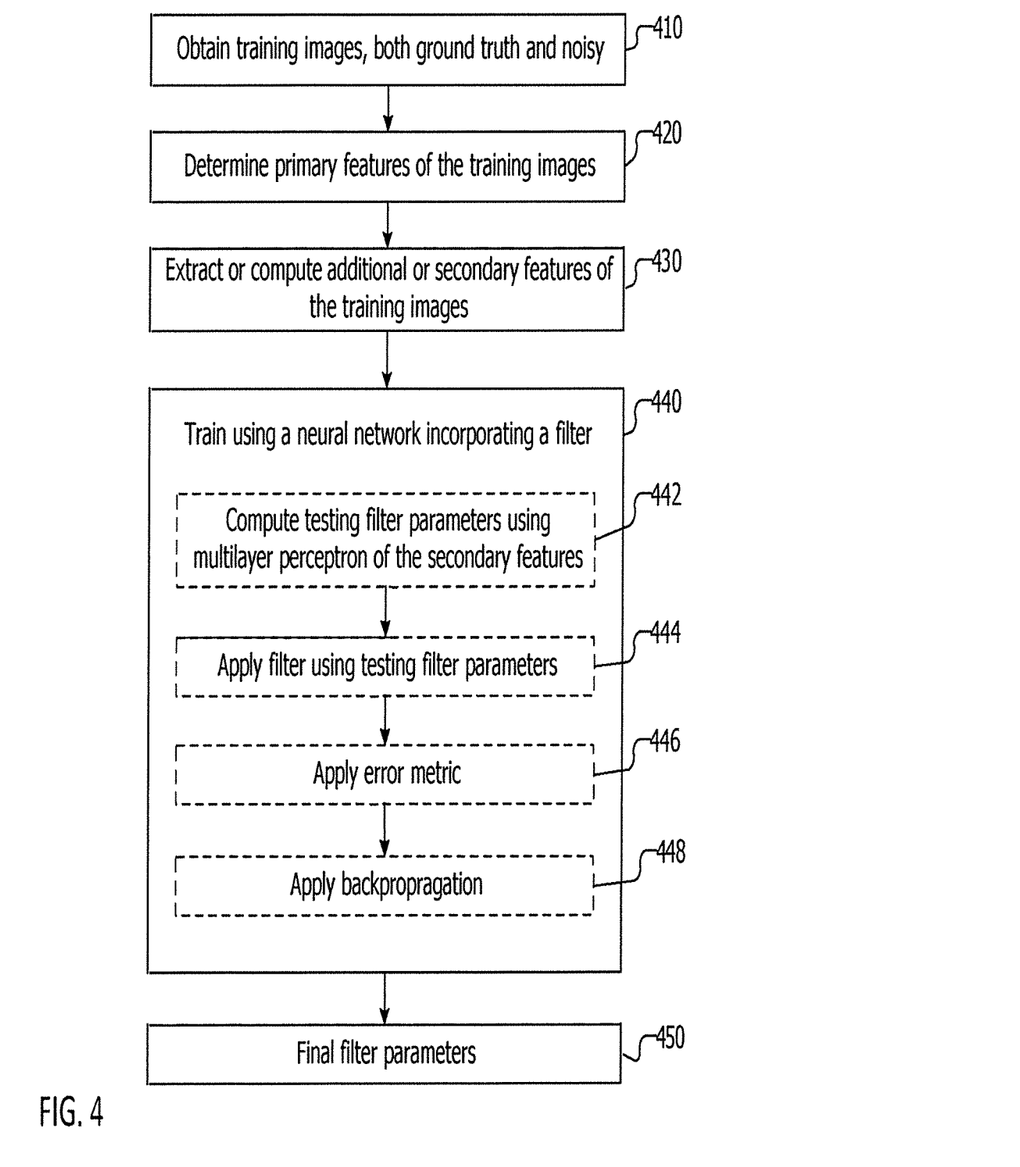
FIG. 4 is a flow chart of a method of training a neural network used in filtering Monte Carlo noise from images.

We now describe a example method to train a neural network in combination with an explicit filter by minimizing the energy function to generate denoised images. Referring now to FIG. 4, training images are obtained, both ground truth and noisy, as shown in block 410. Primary features of the training images are determined, as shown in block 420. Secondary features of the training images are extracted or computed, as shown in block 430. The secondary features may be based on or computed from the primary features or may be extracted or computed independent of the primary features. Training is then performed using a neural network incorporating a filter, as shown in block 440. The training includes computing filter parameters using a multilayer perceptron of the secondary features, as shown in block 442. A filter is applied using these initial filter parameters, as shown in block 444. An error metric is applied, as shown in block 446. The error metric is used to compare denoised images with the ground truth images. Backpropagation is then applied, as shown in block 448, which serves to improve or correct the weights of the neural network so that the filter parameter it outputs would produce denoised images that are closer to the ground truth images. The results are a trained model that generates filter parameters 450 that produce near ground truth, denoised images from noisy images.

Neural Network.

In one embodiment, the machine learning system includes three elements: (1) a machine learning model, (2) an appropriate error metric to measure the distance between the filtered and ground truth images and represent the energy or loss function, and (3) an optimization strategy to minimize the energy function.

Example MLP Learning Model

In one embodiment, the machine learning model is represented as a neural network in the form of a multilayer perceptron (MLP), although as described earlier other machine learning models can be used. An MLP is a simple and powerful system for discovering complex nonlinear relationships between inputs and outputs. Moreover, MLPs are inherently parallel and can be efficiently implemented on a GPU and are very fast once trained, which is important for rendering. The method described in this particular implementation differs from standard MLPs in that a filter is incorporated into the training process, and applied to MC denoising. By using a filter during machine learning and particularly with the MLP, the method "backpropagates" to update the parameters of the neural network during training. To be used in this way, the filter must be differentiable with respect to filter parameters. Filters such as Gaussian, cross-bilateral, and cross non-local means filters are all differentiable and may be incorporated in the method. Other differentiable filters may also be used. Furthermore, non-differentiable filters can also be used by approximating the gradients numerically.

Figure 5:
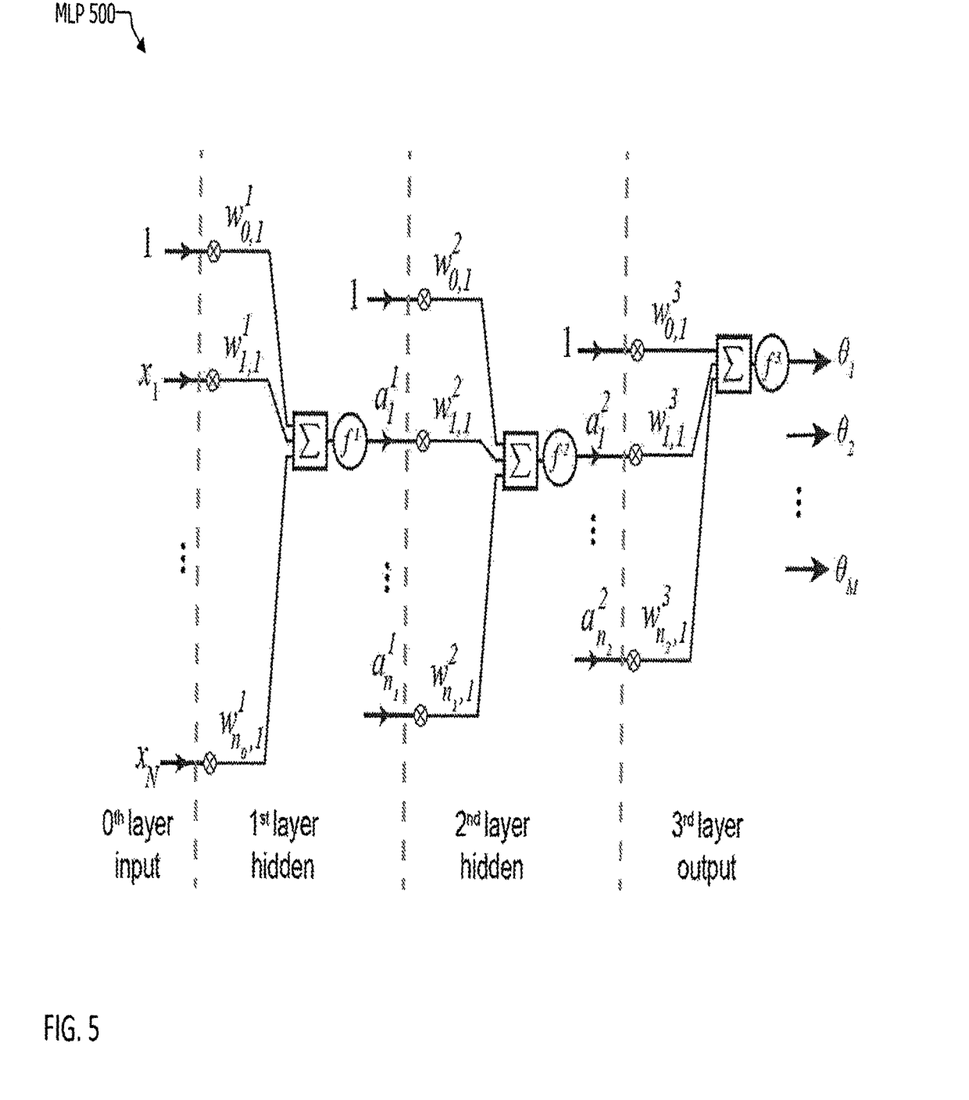
FIG. 5 is a diagram showing a multilayer perceptron.

As shown in FIG. 5, the MLP 500 consists of multiple layers known as the input, hidden, and output layers. Each layer has several nodes which are fully connected to all nodes in the next layer through parameters. The output of a certain node is a function of the weighted sum of the outputs of the nodes from the previous layer plus an additional bias term used as an offset. Specifically, the output of the $i^{th}$ node at the $l^{th}$ layer is:

$$a_s^l = f^l\left(\sum_{t=1}^{n_{(l-1)}} w_{t,s}^l a_t^{l-1} + w_{0,s}^l\right),$$

where $n_{(l-1)}$ is the number of nodes in layer l-1, $w_{t,s}^l$ is the weight associated with the connection between node t in layer l-1, and node s in layer l, $w_{o,s}^l$ is the bias for this node, and $f^l$ is the activation function for layer l. In one implementation, nonlinear activation functions are used in all layers. Multiple kinds of nonlinear activation functions may be used, such as the sigmoid function $f^l(x)=1/(1+e^{-x})$. In various implementations, combinations of linear and non-linear activation functions may be used.

The Error Metric

The error metric to measure the error between the filtered and ground truth pixel values used in the example preferred filter-parameter method is a modified relative mean squared error (RelMSE) metric:

$$E_i = \frac{n}{2} \sum_{q \in \{r,g,b\}} \frac{(\hat{c}_{i,q} - c_{i,q})^2}{c_{i,q}^2 + \varepsilon},$$

where n is the number of samples per pixel, $\hat{c}_{i,q}$ and $c_{i,q}$ are the $i^{th}$ color channel of the filtered and ground truth pixels, respectively, and $\varepsilon$ is a small number (0.01 in one implementation) to avoid division by zero. In this equation, division by $c_{i,q}^2$ is incorporated to account for human visual sensitivity to color variations in darker regions of the image by giving higher weight to the regions where the ground truth image is darker. Further, by multiplying the squared error by n, an inverse relationship to training image bias is removed and all images therefore have an equal contribution to the error regardless of sampling rate. In addition, division by 2 is included to produce a simpler derivative. We note however, that other error metrics (L1, MAE, MSE, SSIM, etc.) are well known in the art and can be used instead.

Optimization Strategy

A preferred optimization starts with a large set of noisy images and the corresponding ground truth images, which can be generated prior to training. For each noisy image, a set of secondary features at each pixel can be extracted. The secondary features are used to train the neural network through an iterative, three-step process called "backpropagation". The goal of backpropagation is to determine the optimal for all nodes in the neural network which minimize the error between the computed and desired outputs (i.e., the ground truth values) for all pixels in the training images, $E = \sum_{x \in allpixels} E_i$.

Before starting the backpropagation process, the weights are randomly initialized to small values around zero (for example, between −0.5 to 0.5 or using standard Xavier initialization). Then in the first step, known as the feedforward pass, the output of the neural network is computed using all inputs. This can be implemented efficiently using a series of matrix multiplications and activation functions applied to the input data to evaluate $a_s^l$ using the equation above. In the second step, the error between the computed and desired outputs is used to determine the effect of each weight on the output error. To do this, the derivative of the error is taken with respect to each weight $\partial E/\partial w_{t,s}^l$. Thus, the activation functions (and the filter as well) need to be differentiable. These two steps are performed for all of the data in the training set. The error gradient of each weight is accumulated. In the third step, all the weights are updated according to their error gradient and the actual error computed using some error metric such as the aforementioned one. This completes a single iteration of training, known as an epoch. Epochs are performed until a converged set of weights is obtained.

$$\frac{\partial E_i}{\partial w_{t,s}^l} = \sum_{m=1}^{M}\left[\sum_{q \in \{r,g,b\}}\left[\frac{\partial E_{i,q}}{\partial \hat{c}_{i,q}} \frac{\partial \hat{c}_{i,q}}{\partial \theta_{m,i}}\right]\frac{\partial \theta_{m,i}}{\partial w_{t,s}^l}\right]$$

Next, a chain rule is used to express the derivative of the energy function.

where M is the number of filter parameters. The first term is the derivative of the error with respect to the filtered pixels $\hat{c}_{i,q}$. This first term can be calculated as:

$$\frac{\partial E_i}{\partial \hat{c}_{i,q}} = n\frac{\hat{c}_{i,q} - c_{i,q}}{c_{i,q}^2 + \varepsilon}.$$

In addition, $\theta_{m,i}$ is the output of the MLP network (shown in FIG. 5 and described above). The middle of the derivative energy function term requires that the filter be differentiable so the derivative of the filtered color with respect to the filter parameters can be computed otherwise this term can be approximated numerically in the case of a non-differentiable filter. The cross-bilateral and cross non-local means filters and Gaussian filter can be used for this, and other filters may also be used.

The derivative energy function is computed for each weight within the neural network, and the weights are updated after every epoch. The process iterates until convergence is achieved.

Primary Features

Primary features are those directly output by the rendering system. In one version of the method, seven primary features (M=7) are used in the cross-bilateral filter. The primary features are: screen position, color, and five additional features (K=5): world position, shading normal, texture values for the first and second intersections, and direct illumination visibility.

During rendering, in an example embodiment, for each sample screen position in x, y coordinates, color in RGB format, world position in Cartesian coordinates (x, y, z), shading normal (i, j, k), texture values for the first and second intersections in RGB format, and a single binary value for the direct illumination visibility, for a total of 18 floating point values. These values are averages for all samples in a pixel to produce the mean primary features for every pixel in the image. At this point, the average direct illumination visibility represents the fraction of shadow rays that see the light and is not a binary value. Moreover, additional features are pre-filtered using a non-local means filter in an 11×11 window with patch size 7×7.

The distance of the color and additional features are normalized by their variances. The following function is used for the color term:

$$D(\bar{c}_i, \bar{c}_j) = \frac{\|\bar{c}_i - \bar{c}_j\|^2}{\psi_i^2 + \psi_j^2 + \zeta},$$

Where $\varphi_i$ and $\varphi_j$ are the standard deviation of color samples at pixel i and j, respectively, and $\xi$ is a small number (such as, for example, $10^{-4}$) to avoid division by zero. For the additional features are expressed by the following function, $$D_k(\bar{f}_{i,k}, \bar{f}_{j,k}) = \frac{\|\bar{f}_{i,k} - \bar{f}_{j,k}\|^2}{\max(\psi_{k,i}^2, \delta)},$$

where $\varphi_{k,i}$ is the standard deviation of the $k^{th}$ feature at pixel i and $\delta$ is a small number (such as, for example, $10^{-4}$) to avoid division by zero. The method smoothes the noisy standard deviations for the additional features $\varphi_{k,i}$ by filtering them using the same weights computed by the non-local means filter when filtering the primary features.

Secondary Features

In an example embodiment, at every pixel, the method can compute a set of secondary features from the neighboring noisy samples to serve as inputs to the neural network.

Feature statistics: the mean and standard deviation for the K=5 additional features are computed for all samples in the pixel. To capture more global statistics, the method also calculates the mean and standard deviation of the pixel-averaged features in a 7×7 block around each pixel. The method computes the statistics for each component (e.g., i, j, k for shading normal) separately and averages them together to create a single value per feature. Thus, according to the preferred method, there are 20 total values for each pixel and the block around it.

Gradients: The gradients of features may be used to decrease the weight of a feature in regions with sharp edges. The method calculates the gradient magnitude (scalar) of the K additional features using a Sobel operator (5 values total).

Mean deviation: This term is the average of the absolute difference between each individual pixel in a block and the block mean. This feature can help identify regions with large errors. In response, the neural network can adjust the filter parameters. For each of the K additional features, the method computes the mean deviation of all the pixel-averaged features in a 3×3 block around each pixel. This feature is computed on each component separately and then averaged to obtain a single value for each additional feature (5 values total).

Median Absolute Deviation (MAD): The preferred method uses the MAD to estimate the amount of noise in each pixel, which is directly related to the size of the filter. The method computes the MAD for each K additional features (5 values total).

Sampling rate: The preferred method uses the inverse of the sampling rate as a secondary feature. The variance of MC noise decreases linearly with the number of samples and, therefore, the filter parameters are made to reflect this variance. The neural network is capable of handling different sampling rates and adjusting the filter size accordingly.

In one preferred embodiment system, the preferred method computes a total of N=36 secondary features for each pixel. These secondary features are used as input to the neural network. The neural network outputs the parameters to be used by the filter to generate the final filtered pixel. The method does this for all the pixels to produce a final result. Secondary features can also be used in the direct approach.

Video Application

Although described herein regarding scene images, the method may be applied to frames of video, including photorealistic frames, graphic frames, cartoon frames, etc. To handle video sequences, the existing neural network described herein may be used without retraining and the cross-bilateral filter can be extended to operate on 3-D spatio-temporal volumes. This modification to the filter is incorporated to reduce the flickering that might appear if each frame is independently filtered. In one version of the method, only three neighboring frames on each side of a current frame (7 frames total) were used for spatio-temporal filtering. The method generates high-quality, temporally-coherent videos from noisy input sequences with low sampling rates. The method can also be re-trained for temporal sequences for potential improvement by having noisy sequences and their corresponding ground truth images and including neighboring frames in the error term.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method of producing an output image, the method comprising:

obtaining training images;

using machine learning incorporating a filter on the training images to output final filter parameters, wherein the using machine learning comprises training a neural network, and the training comprises:

extracting, determining and/or computing features from the training images;

computing test filter parameters using a machine learning model including applying the filter using the features to create a denoised image;

applying an error metric to the denoised image;

correcting the machine learning model based on the error metric including updating the testing filter parameters;

repeating the computing, the applying and the correcting to determine final filter parameters;

receiving a Monte Carlo rendered image that has noise;

executing the filter on the noisy image using the final filter parameters to generate an output image.

2. The method of claim 1, wherein the training images include both ground truth training images and noisy training images.

3. The method of claim 1 wherein the extracting, determining and/or computing features includes:

determining primary features of the training images;

extracting and/or computing secondary features of the training images using the primary features.

4. The method of claim 3, wherein the primary features include features selected from the group consisting: positions, colors, world positions, visibility, shading normals, texture values.

5. The method of claim 4, wherein the secondary features include features selected from the group consisting of: variances and noise approximation in local regions, mean of primary features at various block sizes, standard deviation of the primary features at various block sizes, gradients of primary features, mean deviation of the primary features, median absolute deviation (MAD) of primary features, sampling rate.

6. The method of claim 1, wherein the training images comprise ground truth sample images.

7. The method of claim 1, wherein the filter comprises a cross-bilateral filter.

8. The method of claim 1, wherein the filter comprises a cross non-local means filter.

9. The method of claim 1, wherein the neural network is a one of a support vector machine, a random forest, deep neural network, multi-layer perceptron, convolutional network, deep convolutional network, recurrent neural network, autoencoder neural network, long short-term memory networks, and generative adversarial network.

10. The method of claim 1, wherein the features comprise color, illumination or texture.

* * * * *